3,438,968
SUBSTITUTED AMMONIUM BASIC ADDITION
SALTS OF RIBONUCLEIC ACID
Alvin J. Glasky, Santa Ana, Calif., assignor to International Chemical and Nuclear Corporation, City of Industry, Calif., a corporation of California
No Drawing. Filed June 23, 1966, Ser. No. 560,924
Int. Cl. C07d 51/50; A61k 27/00
U.S. Cl. 260—211.5                    5 Claims

ABSTRACT OF THE DISCLOSURE

Novel substituted ammonium basic addition salts of ribonucleic acid and their method of preparation by the neutralization of ribonucleic acid with substituted organic amines. The compounds are useful as central nervous system stimulants.

---

It is the object of the present invention to provide a novel class of substituted ammonium basic addition salts of ribonucleic acid.

Another object of the present invention is to provide a method for the preparation of novel substituted ammonium basic addition salts of ribonucleic acid.

It is also an object of the present invention to provide a novel class of compounds which are particularly suitable as central nervous system stimulants.

These and other objects of the present invention will become apparent from the more detailed description which follows:

Briefly, the present invention comprises a group of substituted ammonium basic addition salts of ribonucleic acid. The invention also includes the preparation of these salts by the reaction of a substituted organic amine wtih ribonucleic acid. The substituted organic amines utilized in the synthesis of the novel salts of the present invention are normally primary and secondary amines containing one or two alkyl, hydroxyalkyl, carboxyalkyl or other similar constituents, each of which contains from one to about four carbon atoms. The compounds are prepared by reacting approximately stoichiometric amounts of the substituted organic amine with ribonucleic acid. The reaction is conveniently, although not necessarily, carried out in the presence of a solvent such as water. The desired salt may be isolated by conventional means such as by evaporation, filtration and the like.

Illustrative of the compounds within the scope of the present invention are 2-dimethylammonium ethanol ribonucleate, 2-diethyl ammonium ribonucleate, the neutralization reaction product of disodium glutamic acid with ribonucleic acid, and the neutralization reaction product of disodium aspartic acid with ribonucleic acid.

The following examples are presented solely to illustrate the invention should not be regarded as limiting in any way. In the examples the parts percentages are by weight unless otherwise indicated.

Example 1

7.5 grams of ribonucleic acid were stirred in an ice bath slowly into 400 ml. deionized water. Most of the ribonucleic acid did not go into solution. The pH of this solution was below 1. Thereupon, the addition of 2-diethylaminoethanol was added. It was observed that the addition of the 2-diethylaminoethanol caused the ribonucleic acid to go completely into solution. The pH was raised with 2-diethylaminoethanol to about 8.5 to form the desired 2-diethylaminoethanol ribonucleate. 200 ml. of cold dioxane was added to precipitate the 2-diethylaminoethanol ribonucleate, and the mixture was allowed to stand overnight in a deep freeze. The next morning the salt had become very flocculent and was easily centrifuged ing a swinging bucket centrifuge. The precipitate was washed three times with a 3–1 mixture of dioxane-ethanol. Thereafter the material was dried in a vacuum desiccator at room temperature. 5.5 grams of 2-diethylaminoethanol ribonucleate were obtained. Three samples of the two 2-diethylaminoethanol ribonucleate salt were weighted into glass vials and kept overnight in a vacuum oven at 100° C. The average weight loss for the three samples after this heat treatment was about 5.9%. The 200 milligram sample of the 2-diethylamino ethanol ribonucleate was subjected to nitrogen and phosphorus analysis. The nitrogen content was found to be 13.2% and the phosphorus content 4.21%. The structure of the 2-diethylaminoethanol ribonucleate was confirmed by ultra violet spectra.

Example 2

About 2.34 gms. of 2-diethylaminoethanol (0.02 mole) were added with stirring to 6.0 gms. of yeast ribonucleic acid dissolved in 100 ml. of water. The resulting solution after standing overnight was evaporated under reduced pressure at 25° C. The residue was taken up in absolute ethanol, filtered, and the solid dried under vacuum. The amount of nucleotides in the ribonucleic acid was measured by UV spectrophotometry. The 2-diethylaminoethanol was also assayed.

Example 3

About 7.5 gms. of 2-diethylaminoethanol in 5 ml. of water was neutralized to a pH of 7.0 with aqueous 10% sulfuric acid. To this solution was added a solution of calcium ribonucleate, 20 gms. in 200 ml. of water. The mixture was allowed to stand overnight at 4° C. The calcium sulfate which formed was removed by filtration and the filtrate evaporated at 30° C. under reduced pressure. The glassy residue was dried overnight at high vacuum and the resulting solid washed with ether and dried again in vacuo. The product was analyzed for ribonucleic acid and diethylaminoethanol.

Example 4

The procedure described in Example 2 was repeated using the disodium salt of aspartic acid neutralized to a pH of 10 in equimolar amounts of ribonucleotides.

Example 5

The procedure described in Example 2 was repeated using the disodium salt of glutamic acid neutralized to pH of 10 with sodium hydroxide in an equimolar amount of ribonucleotides.

Example 6

The procedure described in Example 2 was repeated using dimethylaminoethanol in place of diethylaminoethanol.

The novel compounds of the present invention are, as has been indicated, particularly useful as central nervous system stimulants. These compounds may be administered intravenously in the form of aqueous solutions in much the same manner as ordinary ribonucleic acid has been administered in the past. This will be immediately apparent to those skilled in the art, these compounds provide a valuable new group of materials which are of potential benefit in the treatment of many nervous disorders subject to amelioration by the stimulation of the synthesis of ribonucleic acid in the brain.

Having fully described the invention it is intended that it be limited only by the lawful scope of the appended claims.

I claim:
1. The neutralization salts of substituted organic amines selected from the group consisting of primary and secondary amines wherein the substituents are alkyl, hydroxy- alkyl, or carboxyalkyl, said substituents each containing from one to about four carbon atoms, and ribonucleic acid.

2. The compound 2-diethylammonium ethanol ribonucleate.

3. The compound 2-dimethylammonium ethanol ribonucleate.

4. The neutralization product of disodium glutamic acid and ribonucleic acid.

5. The neutralization product of disodium aspartic acid and ribonucleic acid.

References Cited

UNITED STATES PATENTS

| 1,678,429 | 7/1928 | Gams et al. | 260—211.5 |
| 3,326,892 | 6/1967 | Lubowe | 260—211.5 |
| 3,340,249 | 9/1967 | Anraky et al. | 260—211.5 |

LEWIS GOTTS, *Primary Examiner.*

J. R. BROWN, *Assistant Examiner.*

U.S. Cl. X.R.

424—180